United States Patent [19]

Wood et al.

[11] Patent Number: 4,940,566
[45] Date of Patent: Jul. 10, 1990

[54] ALLOY AND METHODS OF USE THEREOF

[75] Inventors: Philip S. Wood, Lancashire; Peter J. Fell, Yorkshire, both of England

[73] Assignee: Rolls-Royce plc, London, England

[21] Appl. No.: 363,919

[22] Filed: Jun. 9, 1989

[30] Foreign Application Priority Data

Jul. 14, 1988 [GB] United Kingdom ............. 8816737
Aug. 9, 1988 [GB] United Kingdom ............. 8818855

[51] Int. Cl.$^5$ ............................................. C22C 19/05
[52] U.S. Cl. ................................. 420/443; 29/402.16; 29/402.18; 228/263.13
[58] Field of Search ................ 420/443; 148/410, 428; 29/402.16, 402.18; 228/263.13

[56] References Cited

U.S. PATENT DOCUMENTS 4,678,635 7/1987 Jahnke ........................ 420/443

Primary Examiner—R. Dean
Attorney, Agent, or Firm—Cushman, Darby & Cushman

[57] ABSTRACT

A nickel based alloy is devised, for the purpose of using it as a brazing foil to join parts of a nickel based superalloy component together to make a whole, or for using it as a powder bound by an acrylic or water based binder, to build up damaged surfaces of a nickel based superalloy. In each case, the finished product has the mechanical strength characteristics of the base metal.

4 Claims, 1 Drawing Sheet

ALLOY AND METHODS OF USE THEREOF

The present invention relates to an alloy for use in the repair of and in the manufacture of turbine components.

More specifically, the alloy of the present invention is suitable for the repair of and in the manufacture of gas turbine engine components, which in use are exposed to direct contact with exhaust gases from the combustion apparatus of such an engine.

As the need arises for gas turbine engines to operate at higher operating temperatures, so a need arises for the developing of new alloys of metal which will withstand the increase in temperature.

The present invention seeks to provide an alloy which by itself or in combination with other alloys, is suitable for use in the repair or manufacture of components the material of which is a nickel based superalloy.

According to the present invention an alloy suitable for use in the repair and/or manufacture of nickel based superalloy components comprises, by weight percentage

| Al | Co | Cr | Fe | Hf | Ta | Ti | W | B | Y | Ni |
|---|---|---|---|---|---|---|---|---|---|---|
| 2 | 9 | 8 | — | 1.0 | 1.0 | 1.25 | 6 | 2.8 | 0.001 | Balance |
| 3 | 11 | 10 | 1.8 | 1.5 | 1.5 | 1.75 | 8 | 3.4 | 0.02 | |

The invention will now be described by way of example, and with reference to the accompanying drawings in which.

Figure 1:
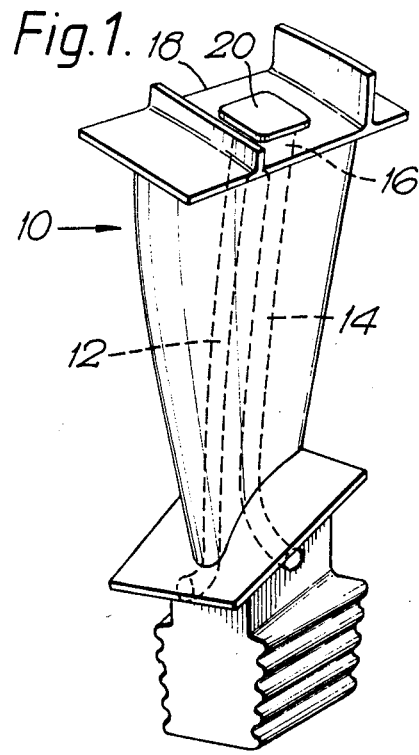
FIG. 1 is a diagrammatic view of a gas turbine engine turbine blade.

Referring to FIG. 1. A gas turbine engine turbine blade 10 is made from a superalloy e.g. MarM002 which is the trade name for one such alloy. The blade 10 has cooling passages 12 and 14 therein which extend within the length of the aerofoil portion 11 and join a plenum chamber 16 at the top of the blade 10.

In order to simplify manufacture, the plenum chamber 16 is formed by casting a hole in the shroud 18 of the blade 10 and then brazing a cap 20 thereover, to seal it against egress of cooling air to atmosphere during operation of the blade 10 in an engine.

The cap 20 is manufactured from material which is identical with that of the blade 10. The braze material however, by weight percentage, is that of the present invention, as follows:

| Al | Co | Cr | Fe | Hf | Ta | Ti | W | B | Y | Ni |
|---|---|---|---|---|---|---|---|---|---|---|
| 2 | 9 | 8 | — | 1.0 | 1.0 | 1.25 | 6 | 2.8 | 0.001 | Balance |
| 3 | 11 | 10 | 1.8 | 1.5 | 1.5 | 1.75 | 8 | 3.4 | 0.02 | |

The alloy of the present invention, for the purpose of brazing the cap 20, will be produced in foil form (not shown), though if it is so desired, it could be applied as a powder layer, to the cap.

In the present example, brazing is achieved by heating the blade 10, complete with the cap 20 and foil in a vacuum to a temperature of 1190° C. and holding that temperature for three hours. The temperature is then allowed to drop to 1000° and thereafter, the assembly is rapidly quenched by a flow of inert gas.

Figure 2:
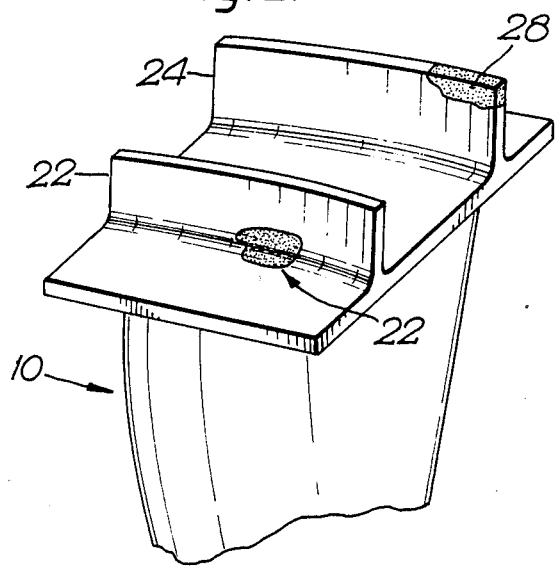
FIG. 2 is a part view of the blade of FIG. 1.

Referring now to FIG. 2. The blade 10 is provided with seal fins 22, 24 which are well known features and consequently will not be described in detail. Suffice it to say that the fin 22 is depicted as having had machining marks obviated, using the alloy of the present invention, at the position indicated by the numeral 26. Further, the tip of the seal fin 24 has had wear damage repaired by using the alloy of the present invention at the position indicated by the numeral 28.

In both cases, the alloy of the present invention was reduced to a powder, a quantity of which was then bound by an acrylic or water based binder of known kind. Thereafter the resulting paste was built up in the damaged portions of the blade 10 and the resulting assembly placed in a vacuum and sinter brazed to a solid form. This method is effected at a temperature which is not so high as to melt the alloy of the invention and, as a technique, is well known.

Further use to which the alloy of the present invention can be put is as a substitute, again in powder form, for the high melting point braze material which is disclosed in granted British Pat. No. 2,107,628 and which is sold under the trade name NICROBRAZ 30.

Mechanical tests performed on a component which has been repaired as described hereinbefore with reference to both sinter brazing and brazing with foil, have shown that the strength characteristics of the component per se, are matched by the alloy of the present invention.

We claim:

1. An alloy suitable for use in the repair and/or manufacture of a nickel based superalloy component consisting of by weight percentage,

| Al | Co | Cr | Fe | Hf | Ta | Ti | W | B | Y | Ni |
|---|---|---|---|---|---|---|---|---|---|---|
| 2 | 9 | 8 | — | 1.0 | 1.0 | 1.25 | 6 | 2.8 | 0.001 | Balance |
| 3 | 11 | 10 | 1.8 | 1.5 | 1.5 | 1.75 | 8 | 3.4 | 0.02 | |

2. A method of using the alloy claimed in claim 1 in the manufacture of a superalloy component comprising the steps of forming a thin foil therefrom, placing the foil between two components and heating and then cooling the whole to effect brazing of the two components together.

3. The method of claim 2 wherein said whole is heated in a vacuum to 1190° C., cooled to 1000° C. in said vacuum and then quenched rapidly relative to the first said cooling, by a flow of inert gas.

4. A method of using the alloy claimed in claim 1 to effect a repair to a superalloy component comprising the steps of reducing the alloy to a powder, binding the powder with an acrylic or water based binder, applying the resulting paste to the damaged area of the component, then heating the whole in vacuum so as to sinter braze the paste to the component, cooling the whole firstly in said vacuum and finally by exposure to a flow of inert gas and thereafter machining the sinter brazed alloy to the described profile of the component.

* * * * *